(12) United States Patent
Levy

(10) Patent No.: US 11,784,831 B1
(45) Date of Patent: Oct. 10, 2023

(54) MANAGEMENT OF DIGITAL CERTIFICATE WITH REPEATED ROLLBACK

(71) Applicant: Amazon Technologies, Inc., Seattle, WA (US)

(72) Inventor: Marcel Andrew Levy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 17/304,537

(22) Filed: Jun. 22, 2021

(51) Int. Cl.
*H04L 9/32* (2006.01)

(52) U.S. Cl.
CPC .................. *H04L 9/3268* (2013.01)

(58) Field of Classification Search
CPC ..................................... H04L 9/3268
See application file for complete search history.

(56) References Cited

U.S. PATENT DOCUMENTS 10,454,689 B1 * 10/2019 Sharifi Mehr ........ H04L 63/166
11,362,843 B1 * 6/2022 Jiang ..................... H04L 9/0891

FOREIGN PATENT DOCUMENTS

CN    102904927 A  *  1/2013   ......... H04L 63/0846

* cited by examiner

*Primary Examiner* — Carl G Colin
*Assistant Examiner* — Hany S. Gadalla
(74) *Attorney, Agent, or Firm* — Knobbe, Martens, Olson & Bear, LLP

(57) ABSTRACT

The present disclosure generally relates to systems and methods for the gradual application of a new digital certificate to a service endpoint or server, with repeated rollbacks to an old digital certificate, whereby the new certificate is applied to a service endpoint and automatically rolled back to the previous certificate after an amount of time. After a period that corresponds to a set amount of time minus the time the new certificate was applied to the endpoint, the process starts again, except with an increased period of time for the new certificate.

21 Claims, 6 Drawing Sheets

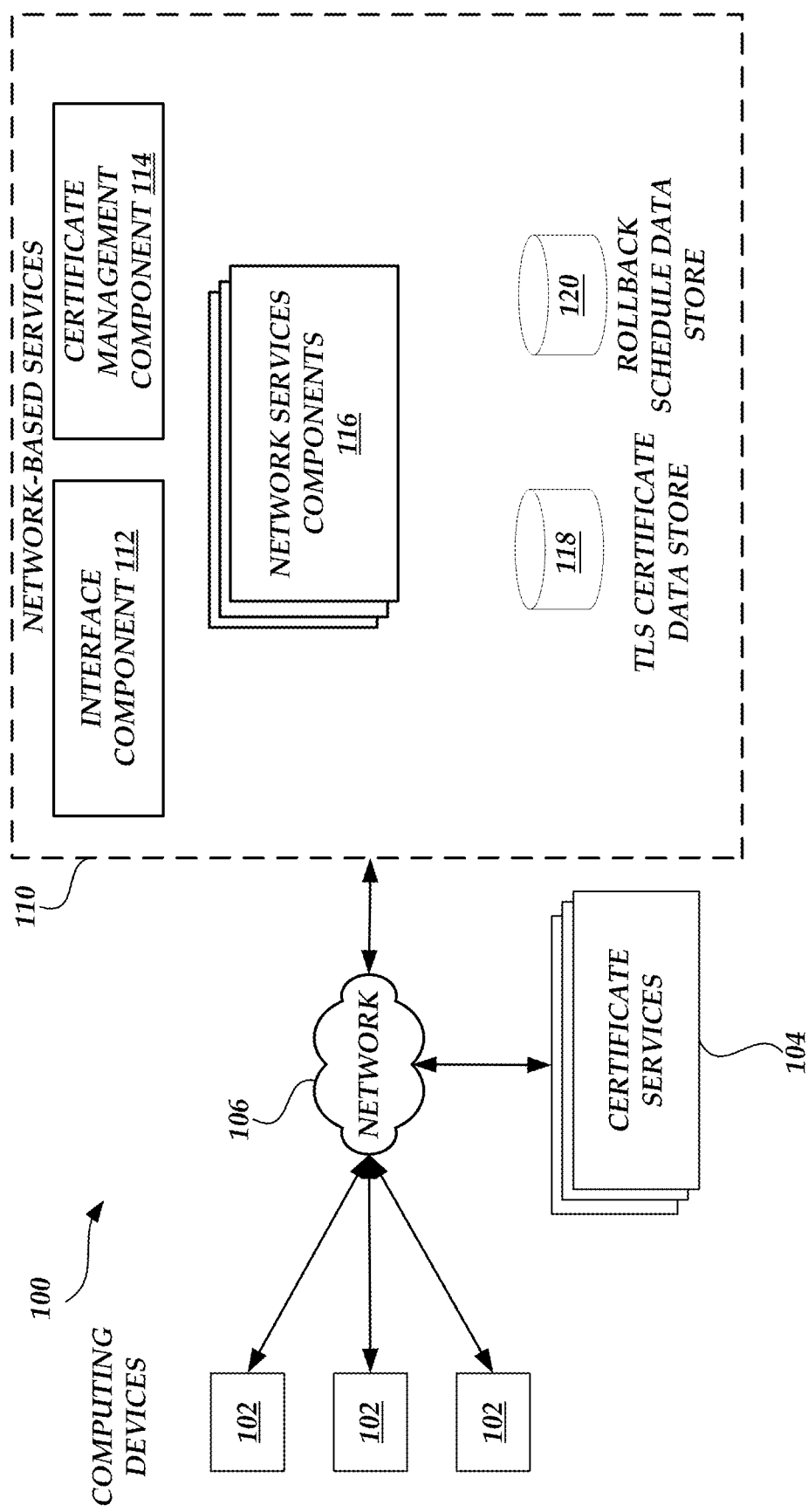

MANAGEMENT OF DIGITAL CERTIFICATE WITH REPEATED ROLLBACK

BACKGROUND

Modern network-based computing relies upon Transport Layer Security (TLS) to maintain secure connections between client devices and servers. One aspect of TLS is the digital certificate. Digital certificates are files that are sent by a host to a client to confirm that host is who it claims to be. TLS certificates are digital certificates that are issued by a certificate authority. The certificate authority signs each certificate, indicating that the server or the service endpoint sending the certificate to the client belongs to the owners of the domain name that is on the certificate. There are a group of certificate authorities that are called publicly-trusted certificate authorities. A connection between a client and a server using digital certificates works as follows: The client initiates a connection with a server. The server then responds with a digital certificate and a public key. The client verifies the certificate or the key and sends back a shared key. The shared key is based on the public key. The server confirms receipt of the shared key. Now, data can flow between the client and server, encrypted using the shared key.

Certificate pinning is a method of digital certificate verification in which the client validates the server's certificate against a known copy. Pinning is very common with mobile applications. The client stores information in a configuration file regarding a service endpoint's certificate locally ("pinning"). When attempting to establish a TLS connection, the client verifies that the server's certificate matches the pinned certificate. To verify a match, the client can validate against the entire certificate or against the public key. Instead of a direct copy of the certificate or key, the client can instead use a fingerprint. A fingerprint is a hashed version of either the entire certificate or the public key. If the fingerprints between the server and the client-pinned certificate match, the connection is valid. If they do not match, the client will reject the connection.

Digital certificates expire. They are usually valid for a period of one to two years, depending on the certification authority. Digital certificate renewal and issuance of new keys can prevent security failures, including the deciphering of keys. Certificate holders receive a notice of expiration, along with information on how to receive a new encryption key, prior to expiration. However, renewal does not always take place within this time frame, and the certificate expires.

BRIEF DESCRIPTION OF THE DRAWINGS

FIG. 1 is a block diagram depicting an illustrative system for implementing a network service including certificate management according to one or more aspects of the present application;

DETAILED DESCRIPTION

Figure 2A:
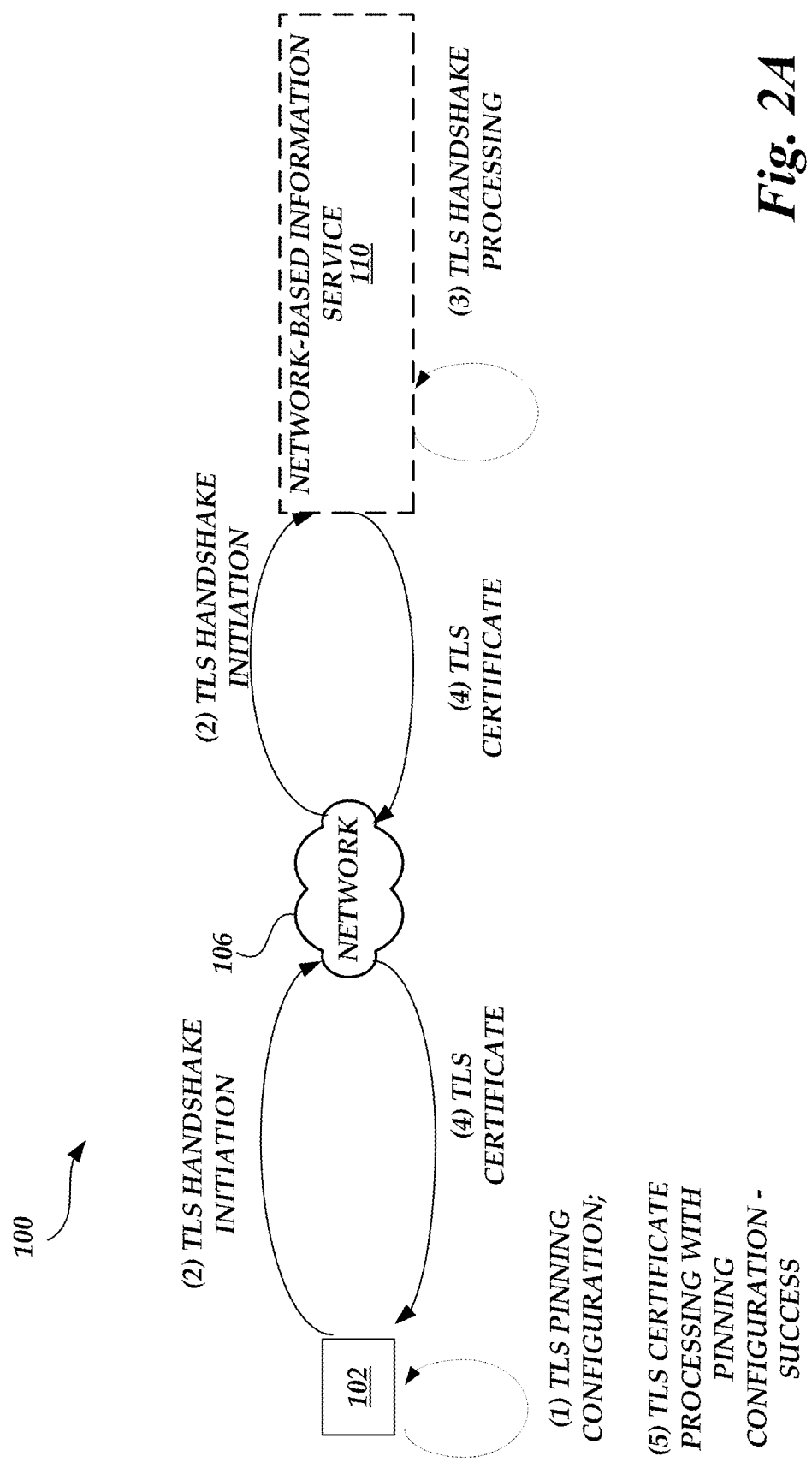
FIGS. 2A-2D are block diagrams of the system of FIG. 1 illustrating various interactions of the components related to the management of TLS certificates.

Aspects of the present disclosure relate to systems and methods for management of digital certificates. More specifically, one or more aspects of the present application correspond to system and method for the implementation of TLS certificate management that corresponds gradual application of new digital certificate. Illustratively, the gradual application of the new digital certificate corresponds to implementation of TLS certificate rollback schedule that defines a plurality of time windows for responding to TLS initiation requests. The plurality of time windows are implemented successively, in which individual time windows specific whether a network service will respond to TLS initiation requests using either the new digital TLS certificate (e.g., an updated TLS certificate) or the previous TLS certificate to TLS initiation requests.

Generally described, when a TLS certificate has expired, a TLS connection cannot be completed between a network service and requesting clients. Thus, new TLS certificates must be issued resulting in a new TLS certificate to be used by the network service. However, when a requesting device has been configured with TLS pinning information, the requesting device will likely reject a new TLS certificate because it does not satisfy the pinning criteria. When many requesting devices have the same certificate pinned, this can result in a significant drop in traffic to a service endpoint, thus causing a major service interruption and potential loss of business before the operator of the service endpoint can rectify the issue.

Illustratively, one or more aspects of the present application can address the above-described deficiencies associated with traditional TLS certificate management methodologies associated with receipt of new TLS certificates. More specifically, in accordance with aspects of the presentation application, each of the plurality of successively applied time windows in the TLS certificate rollback schedule corresponds to a fixed time period, such as 60 minutes. Within the fixed time period, a network service will respond to TLS initiation requests during a first portion of the fixed time period with a new TLS certificate provided by a TLS authority and that does not likely satisfy TLS pinning criteria implemented by the requesting devices. This will result in a rejection or failure of TLS initiation requests during the first portion of the fixed time period. The network service will respond to TLS initiation requests during a second portion of the fixed time period with the previous TLS certificate provided by a TLS authority and that satisfies TLS pinning criteria implemented by the requesting devices, generally referred back to a rollback of the TLS certificate. This will result in a success TLS initiation requests during the second portion.

For each successive time window in the plurality of time windows in the TLS certificate rollback schedule, the first portion of the fixed time period in which the network services responds with the new TLS certificate increases according to a fixed schedule, such as a multiple of a previous value, non-linear increase, predefined values, and the like. This results in an increase in the rejection or failure of TLS initiation requests during the first portion of the fixed time period according to the same fixed schedule. As the rejection or failure of TLS initiation requests increases, an administrator or user of the requesting device can be alerted to cause an update or removal of the TLS pinning criteria during the implementation of the TLS certificate rollback schedule. Thereafter, the network service can permanently cause adoption or implementation of the new TLS certificate. However, the requesting devices can mitigate the potential loss of failure or rejection of all TLS connections that would otherwise be experienced by simple transition to the new TLS certificate without prior modification of the TLS pinning criteria.

Although aspect of the present application will be described with regard to illustrative digital certificates and communication protocols, such as TLS, one skilled in the relevant art will appreciate that one or more aspects of the present application may be implemented in accordance with various digital certificates and communication protocols. Additionally, the illustrative examples related to time windows and implementation of a TLS rollback schedule are intended to be illustrative in nature and should not be construed as limiting.

FIG. 1 depicts a block diagram of an embodiment of the system 100. The system 100 can comprise a network, the network connecting a number of computing devices 102, a number of certificate services 104, and a network-based service component 110. Illustratively, the various aspects associated with the network-based service component 110 can be implemented as one or more components that are associated with one or more functions or services. The components may correspond to software modules implemented by one or more computing devices, which may be separate stand-alone computing devise. Accordingly, the components of the network-based service component 110 should be considered as a logical representation of the service, not requiring any specific implementation on one or more computing device.

The network 106 depicted in FIG. 1 connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network and the hardware and software in the network service provider that provide those services. In some embodiments, the network may be a content delivery network.

The computing devices 102 in FIG. 1 can connect to the network and the network-based service component 110. The computing devices can be configured to transmit a request to the network-based service component 110 to illustratively access one or more network-based services using a communication protocol, such as TLS. For purposes of the present application, the initiation and subsequent processing of the communication requests by computing devices 102 and the network-based service component 110 will be described. The computing devices 102 are configured to have at least one processor. That processor can be in communication with memory for maintaining computer-executable instructions. The computing devices 102 may be physical or virtual. The computing devices may be mobile devices, personal computers, servers, or other types of devices. The computing devices may have a display and input devices through which a user can interact with the user-interface component. In some embodiments, the computing devices 102 have stored in memory the programs and instructions necessary to configured TLS pinning criteria as described herein.

Illustratively, the network-based service component 110 can include an interface component 112 for obtaining digital certificate information from one or more certificate authorities, such as TLS certificates. Illustratively, the interface component 112 also represents one or more interfaces for obtaining TLS initiation requests from requesting devices, e.g., computing devices 102. The network-based information service component 110 can further include a number of components related to implementation of TLS certificate management, namely, TLS certificate rollback methodologies of the present application. These components can include a certificate management component 114 and information stores for associated set of data items corresponding to the certificate management component 114, including a TLS certificate data store 118, and a TLS certificate rollback data store 120. Illustratively, service components 116 represent the various functionality and additional networking components that the network-based service 110 provides to the computing devices 102. In one embodiment, the certificate management component 114 may be implemented by individual service components 116 (or integrated therein). Alternatively, the certificate management component 114 may be implemented as a stand-alone component and provide TLS certificate information to components managing TLS communications.

Turning now to FIGS. 2A-2D, illustrative interactions of the components of the system 100 will be described. For purposes of the illustration, it can be assumed that a network-based service component 110 includes a current TLS certificate that is valid and has not yet expired. Additionally, the network-based service component 110 will receive requests to instantiate a TLS-based communication with one or more requesting device, such as computing device 102. Accordingly, only a single computing device 102 is illustrated for purposes of simplicity. With reference to FIG. 2A, at some point during the utilization of the current TLS certificate, the computing device 102 implements TLS certificate pinning configuration that corresponds to the current TLS certificate at (1). As described above, the computing device 102 stores information in a configuration file regarding a service endpoint's certificate locally ("pinning"). When attempting to establish a TLS connection, the client verifies that the server's certificate matches the pinned certificate. To verify a match, the client can validate against the entire certificate, public key, hash or the like.

Thereafter, at (2), the computing device 102 (e.g., the requesting device) transmits a TLS handshake request that corresponds to a request to initiate communications with the network-based service component 110 in accordance with the TLS communication protocol. For example, the computing device 102 may wish to access or communicate with one or more services provided by the network-based service component 110. At (3), the network-based service component 110 process the TLS request, which includes the identification of the current TLS certificate maintained by the network-based service component 110.

At (4), a responsive communication including the current TLS certification is transmitted from the network-based service component 110 to the requesting computing device 102. As described above, in response to the communication from the network-based service component 110, to establish a TLS connection, the computing device 102, at (5), verifies that the server's certificate matches the pinned certificate criteria. For purposes of the present illustration in FIG. 2A, because the pinning criteria corresponds to the current TLS certificate, the processing of the responsive communication with the current TLS certificate is illustrated as successful for matching the TLS pinning criteria.

Figure 2B:
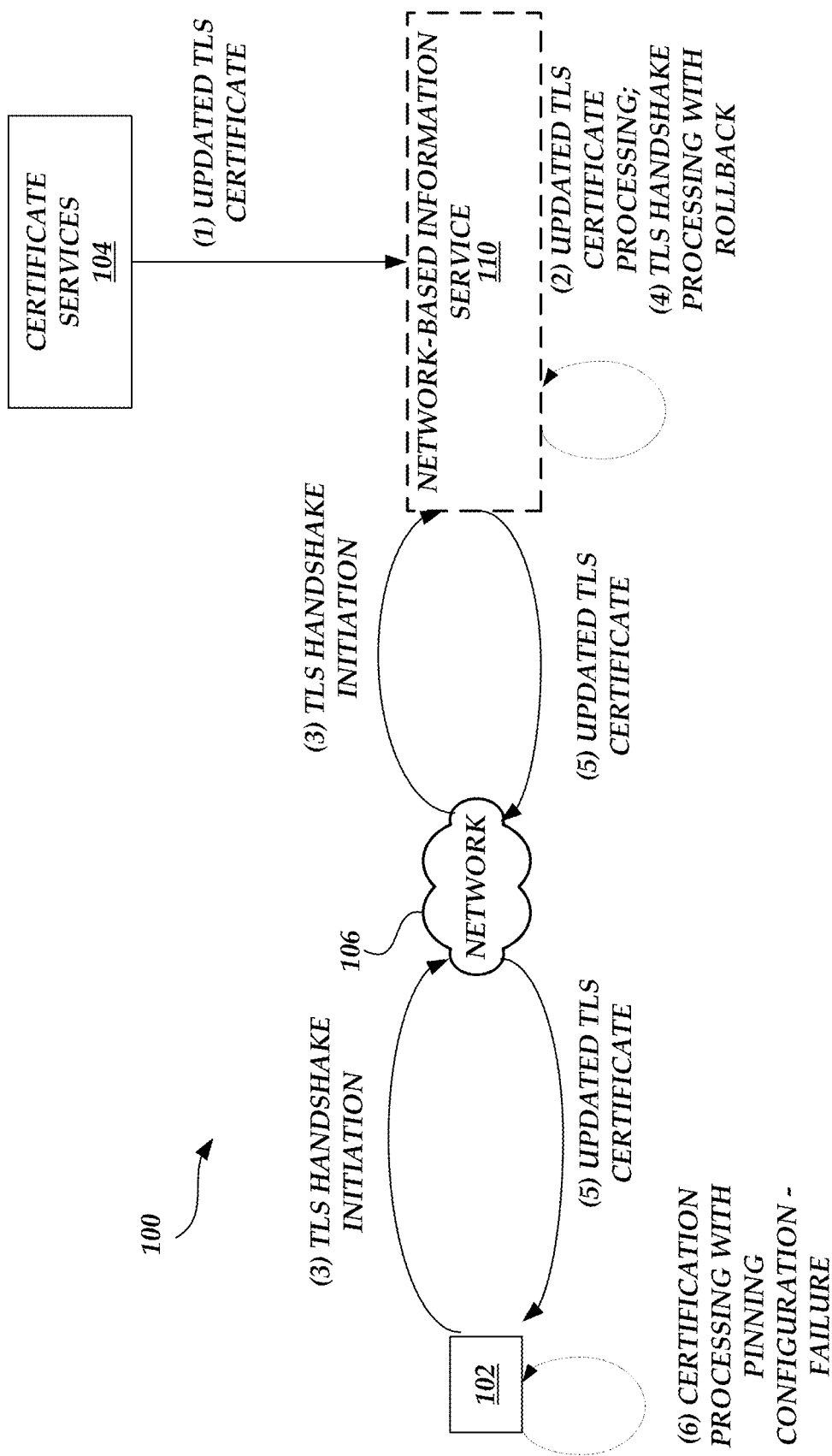

With reference now to FIG. 2B, prior to expiration of the current TLS certificate (or prior to any invalidation of the current TLS certificate), at (1), the network-based service component 110 receives a new TLS certificate from a TLS certificate authority 104. The new TLS certificate may be generally referred to as an updated TLS certificate, although it may not be an actual update of a current or other previous TLS certificate. Thereafter, at (2), the computing device 102 (e.g., the requesting device) transmits a TLS handshake request that corresponds to a request to initiate communications with the network-based service component 110 in accordance with the TLS communication protocol. At (3), the network-based service component 110 processes the updated TLS certificate by determining or obtaining a TLS certificate rollback schedule.

As described previously, in accordance with aspects of the present application, the TLS certificate rollback schedule corresponds to a plurality of successively applied time windows defined in the TLS certificate rollback schedule. In one embodiment, each time window in the plurality of time windows corresponds to a fixed time period, such as 60 minutes. Within the fixed time period, a network service will respond to TLS initiation requests during a first portion of the fixed time period with a new TLS certificate provided by a TLS authority and that does not likely satisfy TLS pinning criteria implemented by the requesting devices. This will result in a rejection or failure of TLS initiation requests during the first portion of the fixed time period. The network service will respond to TLS initiation requests during a second portion of the fixed time period with the previous TLS certificate provided by a TLS authority and that satisfies TLS pinning criteria implemented by the requesting devices, generally referred back to a rollback of the TLS certificate. This will result in a success TLS initiation requests during the second portion.

For each successive time window in the plurality of time windows in the TLS certificate rollback schedule, the first portion of the fixed time period in which the network services responds with the new TLS certificate increases according to a fixed schedule, such as a multiple of a previous value, non-linear increase, predefined values, and the like. This results in an increase in the rejection or failure of TLS initiation requests during the first portion of the fixed time period according to the same fixed schedule.

Table 1 illustrates a sample TLS certificate rollback schedule including six successful time windows. In the example of Table 1, each individual time window corresponds to a 60 minute fixed time window. Additionally, the new certificate time window increases the time window of the first portion as a doubling of the previous value.

TABLE 1

| New Certificate Time Window (Portion 1) (minutes) | Old Certificate Time Window (Portion 2) (minutes) |
| --- | --- |
| 1 | 59 |
| 2 | 58 |
| 4 | 56 |
| 8 | 52 |
| 16 | 44 |
| 32 | 28 |

Table 2 illustrates a sample TLS certificate rollback schedule including six successful time windows. In the example of Table 1, each individual time window corresponds to a 90 minute fixed time window. Additionally, the new certificate time window increases the time window of the first portion according to a manually created increases not necessarily corresponding to a liner or non-linear increase.

TABLE 2

| New Certificate Time Window (Portion 1) (minutes) | Old Certificate Time Window (Portion 2) (minutes) |
| --- | --- |
| 1 | 89 |
| 2 | 88 |
| 15 | 75 |
| 35 | 55 |
| 55 | 35 |

For purposes of illustration, in the embodiment of FIG. 2B (4), a responsive communication including the updated (or new) TLS certification is transmitted from the network-based service component 110 to the requesting computing device 102. As described above, in response to the communication from the network-based service component 110, to establish a TLS connection, the computing device 102, at (5), does not match the server's certificate with the pinned certificate criteria. For purposes of the present illustration in FIG. 2B, because the pinning criteria corresponds to the current TLS certificate, the processing of the responsive communication with the new TLS certificate is illustrated as failure for matching the TLS pinning criteria. As described above, the failure of the TLS certificate request would be written to log fails or made visible to a system administrator.

Figure 2C:
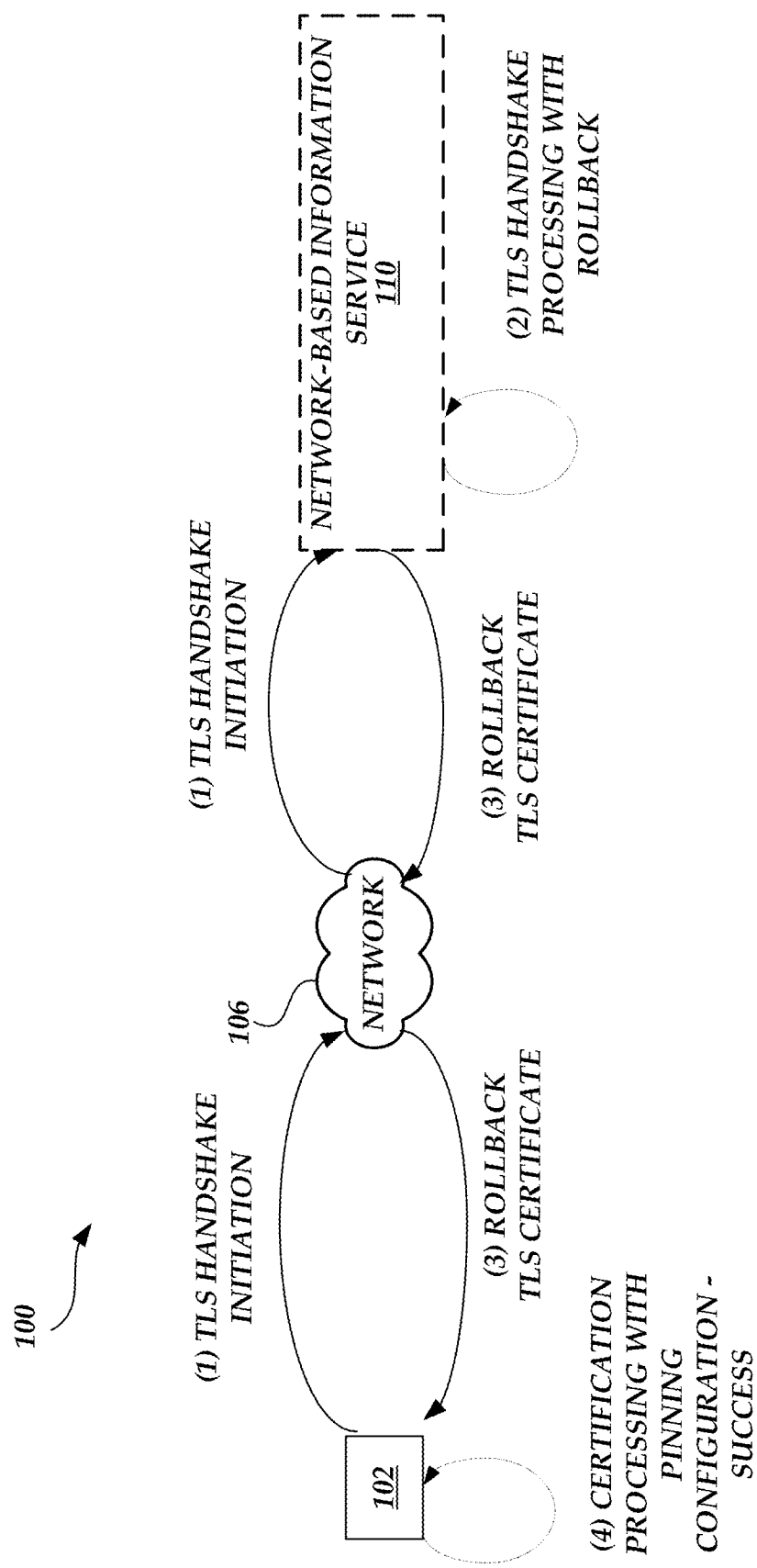

Turning now to FIG. 2C, for purposes of illustration, during the same time window, assume that the time window for providing the updated TLS certificate has expired. Accordingly, the network-based service component 110 will now service TLS initiation requests using the previous TLS certificate. At (1), the computing device 102 (e.g., the requesting device) transmits a TLS handshake request that corresponds to a request to initiate communications with the network-based service component 110 in accordance with the TLS communication protocol. At (2), the network-based service component 110 process the TLS request, which includes the identification of the current TLS certificate maintained by the network-based service component 110 according to the current time window in the TLS certificate rollback schedule.

At (3), a responsive communication including the current TLS certification is transmitted from the network-based service component 110 to the requesting computing device 102. As described above, in response to the communication from the network-based service component 110, to establish a TLS connection, the computing device 102, at 4), verifies that the server's certificate matches the pinned certificate criteria. For purposes of the present illustration in FIG. 2C, because the pinning criteria corresponds to the current TLS certificate, the processing of the responsive communication with the current TLS certificate is illustrated as successful for matching the TLS pinning criteria. Accordingly, access to the network-based service component 110 is not completely prevented because of the utilization of the previous TLS certificate (e.g., the rollback TLS certificate).

For purposes of illustration, the majority of the interaction in FIGS. 2B and 2C would be repeated for the next successive time window in the TLS certificate rollback schedule (absent the receipt of a new TLS certificate in FIG. 2B). Illustratively, the amount of time the new or updated TLS certificate is provided increases in a manner that can be increasingly significant to the requesting devices. In some situations, the TLS certificate rollback schedule may be configured with specific values for the first portion time window such that the error rate or error percentage can be clearly identified by a system administrator as a notification to update or remove pinning configurations associated with the previously issued TLS certificate (e.g., an error rate not otherwise attributable to other TLS initiate request failures). In this regard, the network-based service component 110 does not have to provide additional notifications to the system administrators. Additionally, administrative systems within the requesting device networks can configured to automatically detect changes in error rates or threshold error rates to identify needs to update or remove TLS certificate pining information.

Figure 2D:
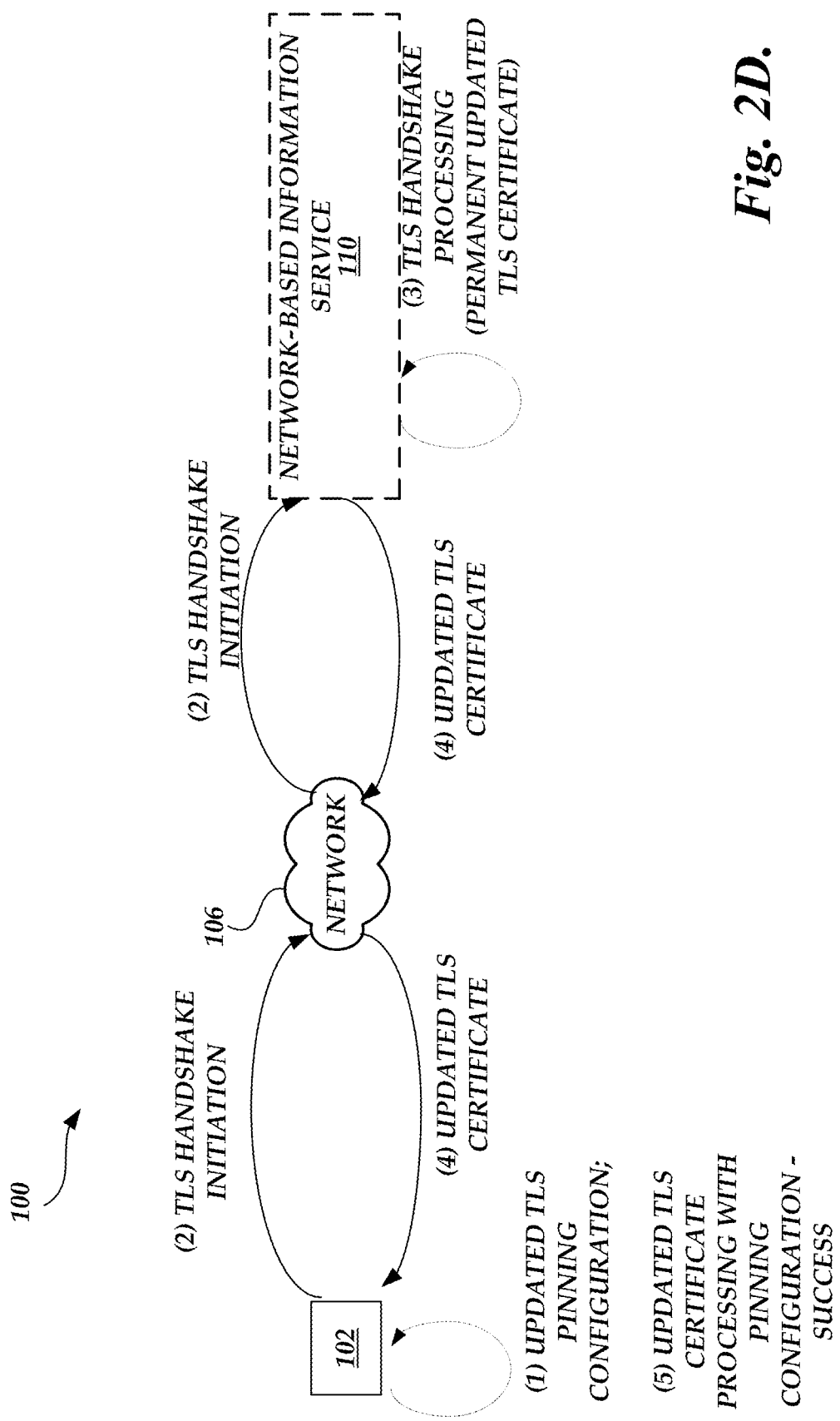

With reference to FIG. 2D, at some point after the completion of the successive time windows in the TLS certificate rollback schedule or if a requesting device has provided indication that pinning information has been completed, the network-based service component 110 can permanently adopt the updated or new TLS certificate. As illustrated in FIG. 2D, at some point, the computing device 102 implements TLS certificate pinning configuration that corresponds to the new TLS certificate at (1). Thereafter, at (2), the computing device 102 (e.g., the requesting device) transmits a TLS handshake request that corresponds to a request to initiate communications with the network-based service component 110 in accordance with the TLS communication protocol. For example, the computing device 102 may wish to access or communicate with one or more services provided by the network-based service component 110. At (3), the network-based service component 110 process the TLS request, which includes the identification of the new TLS certificate maintained by the network-based service component 110.

At (4), a responsive communication including the new TLS certification is transmitted from the network-based service component 110 to the requesting computing device 102. As described above, in response to the communication from the network-based service component 110, to establish a TLS connection, the computing device 102, at (5), verifies that the server's certificate matches the pinned certificate criteria. For purposes of the present illustration in FIG. 2D, because the pinning criteria has been updated, it corresponds to the new TLS certificate. Accordingly, the processing of the responsive communication with the new TLS certificate is illustrated as successful for matching the TLS pinning criteria.

Figure 3:
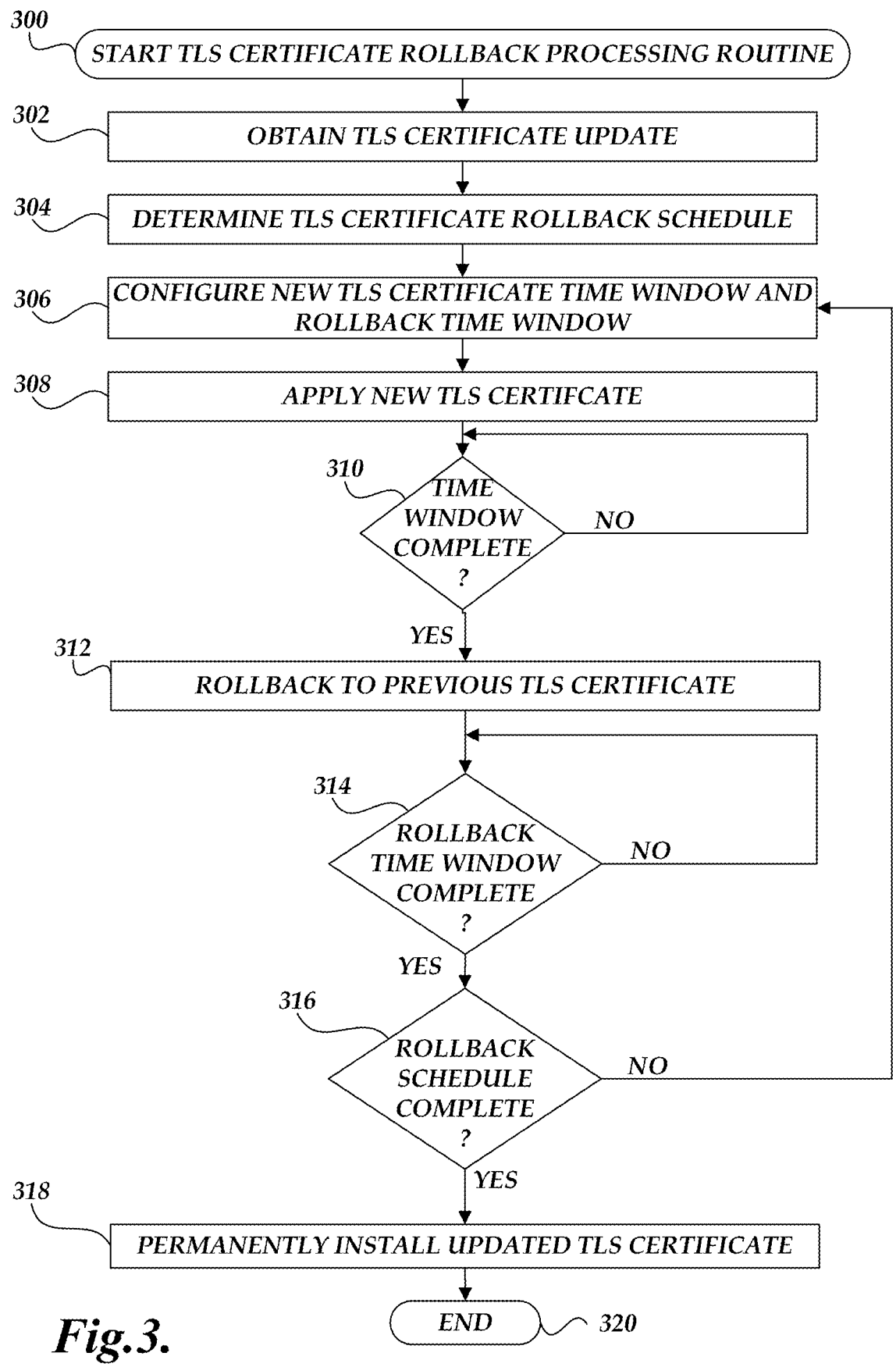
FIG. 3 is a flowchart depicting an example routine for implementing certificate management in accordance with aspects of the present application.

Turning now to FIG. 3, a routine 300 for managing a TLS certificate rollback schedules will be described. Illustratively, routine 300 is implemented by a management component that is part of a network service 110 or individual network services 116, as described herein. As also described above, at some point during the utilization of the current TLS certificate, the computing device 102 implements TLS certificate pinning configuration that corresponds to the current TLS certificate. As described above, the computing device 102 stores information in a configuration file regarding a service endpoint's certificate locally ("pinning"). When attempting to establish a TLS connection, the client verifies that the server's certificate matches the pinned certificate. To verify a match, the client can validate against the entire certificate, public key, hash or the like.

At block 302, the network-based service component 110 receives a new TLS certificate from a TLS certificate authority 104. The new TLS certificate may be generally referred to as an updated TLS certificate, although it may not be an actual update of a current or other previous TLS certificate. It assumed that for at least a portion of the execution of routine 300, the current TLS certificate and the new TLS certificate will remain valid (e.g., non-expired) and can be provided by the network-based service component 110 in response to TLS request.

At block 304, the network-based service component 110 processes the updated TLS certificate by determining or obtaining a TLS certificate rollback schedule. As described previously, in accordance with aspects of the present application, the TLS certificate rollback schedule corresponds to a plurality of successively applied time windows. In one embodiment, individual time windows in the plurality of time windows can correspond to a fixed time period, such as 15, 20, 25, 30, 35, 40, 45, 50, 55, 60, 65, 70, 75, 80, 85, 90, 95, 100 minutes or any other measure of time that may be appropriate for the amount of TLS requests received by the network-based service component 110. Although time is described as a measure for the TLS certificate rollback schedule, in other embodiments, other information may be utilized to control which TLS certificate is provided, such as a count of the TLS request (e.g., 100 TLS requests), origin source (e.g., which requesting device), request attributes, and the like.

At block 306, the network-based service component 110 configures time windows for providing the new TLS certificate (e.g., new TLS certificate time window or first portion) and for providing the existing TLS certificate (e.g., the rollback time window). Within the fixed time period (time, requests, etc.), a network service will respond to TLS initiation requests during a first portion of the fixed time period with a new TLS certificate provided by a TLS authority and that does not likely satisfy TLS pinning criteria implemented by the requesting devices. This will result in a rejection or failure of TLS initiation requests during the first portion of the fixed time period. During the remainder of the fixed time period, the network service will respond to TLS initiation requests during a second portion of the fixed time period with the previous TLS certificate provided by a TLS authority and that satisfies TLS pinning criteria implemented by the requesting devices, generally referred back to a rollback of the TLS certificate. This will result in a success TLS initiation requests during the second portion.

With reference to routine 300, at block 308, the network-based service component 110 applies the new (or updated) TLS certificate. For each successive time window in the plurality of time windows in the TLS certificate rollback schedule, the first portion of the fixed time period in which the network services responds with the new TLS certificate increases according to a fixed schedule, such as a multiple of a previous value, non-linear increase, predefined values, and the like. This results in an increase in the rejection or failure of TLS initiation requests during the first portion of the fixed time period according to the same fixed schedule. To implement, at decision block 310, a test is conducted to determine whether the time period specified for providing the updated or new TLS certificate has expired. If not, the routine 300 returns to decision block 310. Once the time period specified for providing the updated or new TLS certificate has expired, at block 312, the network-based service component 110 applies the previous TLS certificate, e.g., rolling back the new TLS certificate. At decision block 314, a test is conducted to determine whether the time period specified for providing the previous or rollback TLS certificate has expired. If not, the routine 300 returns to decision block 314.

As described previously, in accordance with aspects of the present application, the TLS certificate rollback schedule corresponds to a plurality of successively applied time windows. Illustratively, for each successive time window in the plurality of time windows in the TLS certificate rollback schedule, the first portion of the fixed time period in which the network services responds with the new TLS certificate increases according to a fixed schedule, such as a multiple of a previous value, non-linear increase, predefined values, and the like. This results in an increase in the rejection or failure of TLS initiation requests during the first portion of the fixed time period according to the same fixed schedule. At decision block 316, a test is conducted to determine whether the TLS certificate rollback schedule is complete. In one example, the network-based service component 110 can check whether there additional time windows are specified in the TLS certificate rollback schedule. In another embodiment, the network-based service component 110 can determine whether a command or notification has been received that indicates that the requested devices have updated the TLS certificate pinning and any additional time windows do not need to be completed. If the rollback schedule is not complete, the routine 300 returns to block 306 to configure the next successive time window in the TLS rollback schedule. Once the rollback schedule is complete, at block 318, the network-based service component 110 permanently adopts/installs the new TLS certificate and the routine 300 terminates at block 320.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A network service comprising:
   an interface component implemented in a computing device having a memory, a processor and computer-executable instructions, the interface component for receiving Transport Layer Security (TLS) initiation requests from a requesting device, wherein the requesting device is configured with current TLS pinning criteria specifying one or more TLS certificate attributes associated with a first TLS certificate; and a TLS certificate management component implemented in a computing device having a memory, a processor and computer-executable instructions, the TLS certificate management component for:

obtaining a second TLS certificate from a TLS certificate authority, wherein the second TLS certificate does not satisfy the current TLS pinning criteria implemented by the requesting device;

determining a TLS certificate rollback schedule, wherein the TLS certificate rollback schedule defines a plurality of TLS certificate rollback time windows for processing TLS initiation requests from the requesting device, wherein individual TLS certificate rollback time windows define a first time window for responding to TLS initiation requests with the first TLS certificate and a second time window for responding to TLS initiation requests with the second TLS certificate;

successively applying the plurality of TLS certificate rollback time windows defined in the TLS certificate rollback schedule; and causing permanent application of the second TLS certificate upon completion of the successively applied plurality of TLS certificate rollback time windows.

2. The network service as recited in claim 1, wherein the individual TLS certificate rollback time windows correspond to a total fixed time period.

3. The network service as recited in claim 2, wherein the total fixed time period is 60 minutes.

4. The network service as recited in claim 1, wherein the second time window in the successively applied TLS rollback time windows is defined according to a fixed schedule.

5. The network service as recited in claim 4, wherein the fixed schedule defines an increase in the second time window as a multiple of a previous second TLS time window.

6. A method for implementing Transport Layer Security (TLS) certificate management comprising:

obtaining an updated TLS certificate from a TLS certificate authority, wherein the updated TLS certificate does not satisfy current TLS pinning criteria implemented by a requesting device;

implementing a TLS certificate rollback schedule, wherein the TLS certificate rollback schedule defines a plurality of TLS certificate rollback time windows for processing TLS initiation requests from the requesting device; and causing permanent application of the updated TLS certificate upon completion of the TLS certificate rollback schedule.

7. The method as recited in claim 6, wherein individual TLS rollback time windows define a first time window for responding to TLS initiation requests with a rollback TLS certificate and a second time window for responding to TLS initiation request with the updated TLS certificate.

8. The method as recited in claim 7, wherein the individual TLS rollback time windows correspond to a total fixed time period.

9. The method as recited in claim 7, further comprising: successively applying the plurality of TLS certificate rollback time windows defined in the TLS certificate rollback schedule, wherein the second time window in the successively applied TLS rollback time windows is defined according to a fixed schedule.

10. The method as recited in claim 9, wherein the fixed schedule defines an increase in the second TLS time window as a multiple of a previous second time window.

11. The method as recited in claim 9, wherein the fixed schedule defines an increase in the second time window according to a non-linear increase.

12. The method as recited in claim 9, wherein the fixed schedule defines at least one of the second time windows as a value communicated to requesting devices.

13. The method as recited in claim 6, wherein implementing a TLS certificate rollback schedule includes implementing the TLS certificate rollback schedule based on implementation criteria.

14. A non-transitory computer-readable medium storing computer-executable instructions that, when executed by a network service, cause the network service to perform operations including:

implementing a Transport Layer Security (TLS) certificate rollback schedule responsive to receipt of an updated TLS certificate from a TLS certificate authority, wherein the TLS certificate rollback schedule defines a plurality of TLS certificate rollback time windows for processing TLS initiation requests from a requesting device-according to at least one of a rollback TLS certificate or the updated TLS certificate; and causing permanent application of the updated TLS certificate upon completion of the TLS certificate rollback schedule.

15. The non-transitory computer-readable medium as recited in claim 14, wherein individual TLS rollback time windows define a first time window for responding to TLS initiation requests with a rollback TLS certificate and a second time window for responding to a plurality of TLS initiation requests with the updated TLS certificate.

16. The non-transitory computer-readable medium as recited in claim 15, wherein the individual TLS rollback time windows correspond to a total fixed time period.

17. The non-transitory computer-readable medium as recited in claim 16, further comprising:

successively applying the plurality of TLS certificate rollback time windows defined in the TLS certificate rollback schedule, wherein the second time window in the successively applied TLS rollback time windows correspond is defined according to a fixed schedule.

18. The non-transitory computer-readable medium as recited in claim 17, wherein the fixed schedule defines an increase in the second time window as a multiple of a previous second time window.

19. The non-transitory computer-readable medium as recited in claim 17, wherein the fixed schedule defines an increase in the second time window according to a non-linear increase.

20. The non-transitory computer-readable medium as recited in claim 17, wherein the fixed schedule defines at least one of the second time windows as a value communicated to requesting devices.

21. The non-transitory computer-readable medium as recited in claim 14 further comprising;

obtaining a command to interrupt the TLS certificate rollback schedule; and causing permanent application of the updated TLS certificate responsive to the command to interrupt the TLS certificate rollback schedule.

* * * * *